Patented Apr. 26, 1949

2,468,277

UNITED STATES PATENT OFFICE 2,468,277

BENZODIOXANE AZO DYESTUFFS

George Clifford Strouse, East Aurora, N. Y., assignor to Allied Chemical and Dye Corporation, New York, N. Y., a corporation of New York No Drawing. Application April 13, 1943,
Serial No. 482,883

5 Claims. (Cl. 260—152)

This invention relates to novel azo dyestuffs.

I have discovered that azo compounds which include in their structure an azo-benzodioxane radical are valuable dyestuffs for textile fibers.

Thus, I have found that water-insoluble monazo (that is, monoazo) compounds which include in their structure an azo-benzodioxane radical and a radical of an azo coupling component that is free of acid salt-forming groups, capable of rendering compounds containing them soluble in water, and which can be obtained, for example, by diazotizing an amino-benzodioxane and coupling the resulting diazo compound with an azo coupling component of the aforesaid type, have affinity for nylon and for cellulose esters and ethers (e. g., cellulose acetate) and dye these materials in attractive shades. The dyeings on cellulose esters and ethers are of particular value because of their fastness to washing and sea water. While it is well known that many water-insoluble azo compounds are suitable in different degrees for dyeing cellulose esters and ethers, many compounds of this class are unsuitable because of their lack of affinity for the fiber, or because of the fugacity of the coloration produced. Thus, it could not have been foreseen that the insoluble monazo compounds of this invention would possess the highly advantageous dyeing power and fastness properties with respect to cellulose esters and ethers which I have discovered.

I have found, moreover, that azo compounds which can be prepared by coupling a diazotized amino-benzodioxane with coupling components of other types, such as those containing acid salt-forming groups, have valuable dyeing properties with respect to other textile fibers. Thus, I have found that metallizable azo dyestuffs (i. e. dyestuffs capable of yielding a complex metal compound upon treatment in substance or on the fiber with a suitable metallizing agent) can be formed by coupling a diazotized amino-benzodioxane with a coupling component containing metal complex-forming substituents; such as, for instance, a hydroxyl group and a carboxyl group occupying ortho positions in a benzene nucleus. For example, the monazo compound formed by coupling diazotized 6-amino-1,3-benzodioxane with salicylic acid dyes wool in yellow shades which can be after-chromed by treatment with an aqueous solution of a chromium salt or chromate.

Other water-soluble dyestuffs may be obtained by coupling a diazotized amino-benzodioxane with a coupling component of the group consisting of naphthol sulfonic acids, naphthylamine sulfonic acids and amino-naphthol sulfonic acids. Dyestuffs of this series are generally suitable for dyeing animal fibers from aqueous dye baths, and dyestuffs which contain not more than one acid salt-forming group are suitable for dyeing nylon materials.

Water-soluble azo dyestuffs according to the invention can be precipitated from the coupling reaction mixture by salting out, for example, after neutralizing or acidifying the mixture, and the precipitated dyestuff can be recovered by filtration in the form of a filter cake.

The preferred dyestuffs according to this invention include in their structure an azo-1,3-benzodioxane radical, and especially a 6-azo-1,3-benzodioxane radical. The water-insoluble dyestuffs of the latter class, which are especially advantageous because of their dyeing power for cellulose esters and ethers and of their shade and fastness properties when employed for this purpose, have the general formula:

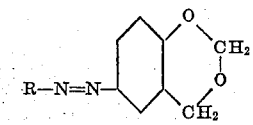

wherein R represents the radical of an azo coupling compound free of acid salt-forming groups. These dyestuffs, when applied in the form of aqueous dispersions for dyeing cellulose esters and ethers, give dyeings of attractive yellow to orange shades having the aforesaid desirable fastness properties. Dyestuffs having a structure corresponding to the foregoing formula can be prepared by coupling diazotized 6-amino-1,3-benzodioxane with an azo coupling component free of acid salt-forming groups.

The monazo dyestuffs of this invention can be prepared in general by diazotizing an amino-benzodioxane, preferably an amino-1,3-benzodioxane, and especially 6-amino-1,3-benzodioxane, at a temperature of about 0° C., by treatment in aqueous mineral acid with a substantially equimolecular amount of nitrous acid; and mixing the resulting solution of the diazo compound with a solution containing an azo coupling component. When the coupling is complete, the dyestuff can be recovered for example by filtration in the form of a filter cake, after precipitation, if need be, by neutralizing or acidifying the coupling mixture, and in some cases by salting out the dissolved dyestuff.

The following examples, wherein parts are by weight and temperatures are in degrees centigrade, illustrate the method for preparing certain of the dyestuffs according to this invention.

Example 1

3 parts of 6-amino-1,3-benzodioxane (0.02 mol part) are dissolved in 25 parts of water containing 5 parts of 20° Bé. hydrochloric acid (0.043 mol part HCl) by gently warming the mixture until solution is complete. The solution is cooled to 0° to 3°, and a solution of 1.5 parts of sodium nitrite (0.022 mol part) in 10 parts of water is slowly added. The resulting diazo solution is then added to an agitated solution, precooled to 0° to 3°, of 1.6 parts of sodium hydroxide (0.04 mol part) and 1.9 parts of phenol (0.02 mol part) in 25 parts of water. The mixture is agitated for about one hour to complete the coupling. Dilute hydrochloric acid is then added to the solution until a colorless runout is obtained when a drop of the mixture is applied to white filter paper. The resulting insoluble azo compound is separated by filtration in the form of a filter cake, and dried, for example, in air at room temperature. The resulting dyestuff, when dispersed in an aqueous medium, for example, by adding a micropulverized mixture of the dyestuff with dextrine to water, and employed for dyeing cellulose acetate fiber, produces yellow shades thereon which are fast to washing and sea water. The dyestuff has the following probable formula:

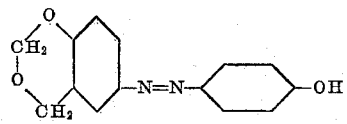

Example 2

A diazonium salt solution prepared as described in Example 1 is added slowly to an agitated solution, cooled to about 0°, of 5 parts of the sodium salt of 5,5-dimethyl-4-ethyl-carboxylate-cyclo-hexa-1,3-dione (0.021 mol part) and 6.5 parts of sodium bicarbonate (0.077 mol part) in 70 parts of water. The coupling mass is agitated for about 16 hours, or until the coupling is complete, as shown by negative results of tests for presence in the mass of free diazo compound, e. g. by absence of formation of a Bordeaux color upon cross-streaking the clear run-out of a sample of the mass on white filter paper with an alkaline solution of 2-naphthol-3,6-di-sodium sulfonate (i. e. R salt). Throughout the coupling period, the mass is tested to assure that it is bicarbonate alkaline (i. e. acid toward phenolphthalein but alkaline toward Nitrazene Yellow paper) and that it contains an excess of the cyclo-hexa-dione coupling component, e. g. by cross-streaking the clear run-out of a test sample of the mass on white filter paper with a solution of tetrazotized orthodianisidine, formation of an orange or red coloration indicating presence of an excess of the coupling component.

The reaction mass is filtered, and the cake of dyestuff is washed on the filter with water until the filtrate is free of alkali and salt. The cake is then dried. The product is a dyestuff which may be represented by the formula:

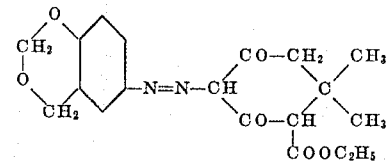

An aqueous dispersion thereof dyes cellulose acetate a yellow shade.

Example 3

3.6 parts of N,N-diethanolaniline (0.02 mol part) are added to a solution at a temperature of 90°, of 0.6 part of a commercial mixture of higher alkyl benzene sulfonates in 72 parts of water. The mixture is stirred and allowed to cool to about 35°.

A diazonium salt solution is prepared as described in Example 1. Any excess of nitrous acid which persists after completion of the diazotization is eliminated by addition thereto of a small amount of an aqueous solution of sulfamic acid.

The dispersed mixture of N,N-diethanolaniline is cooled by addition of ice to about 0° and the diazo solution is then added. The mineral acidity of the mixture is reduced by addition of 4 parts of sodium acetate, and thereafter the mass is agitated until coupling is complete, as shown by negative results of a test for excess diazo compound, as indicated in Example 2. The mass is then filtered. The filter cake of dyestuff is washed with water until the washings are clear and neutral, and is then dried.

The dyestuff may be represented by the formula:

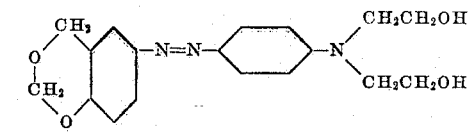

Aqueous dispersions thereof dye cellulose acetate a brilliant yellow shade.

In the following examples, a series of monazo dyestuffs suitable for coloring cellulose acetate are produced by coupling diazotized 6-amino-1,3-benzodioxane prepared as described in Example 1, with equimolecular quantities of the following azo coupling components. The resulting dyestuffs dye cellulose acetate in the indicated shades which possess advantageous fastness properties similar to those of the dyestuff of Example 1.

| Example No. | Coupling Component | Shade of Monazo Dyestuff |
|---|---|---|
| 4 | Beta-naphthol | Reddish-Orange. |
| 5 | m-Toluidine | Yellow. |
| 6 | p-Xylidine | Do. |
| 7 | N-ethyl-N-ethanol-aniline | Do. |
| 8 | N-ethyl-N-dihydroxypropyl-aniline | Do. |
| 9 | Amino-cresol methyl ether (3-Amino-1-methyl-4-methoxy-benzene). | Do. |
| 10 | 2, 4-Dioxyquinoline | Do. |
| 11 | 1-Phenyl-3-methyl-5-pyrazolone | Yellow-Orange. |

Example 12

3 parts of 6-amino-1,3-benzodioxane are diazotized as described in Example 1 and coupled with 2.76 parts of salicylic acid, dissolved in 25 parts of water containing 1.6 parts of sodium hydroxide. The resulting dyestuff is recovered from the coupling reaction mixture in the form of a water-soluble sodium salt by addition of common salt (NaCl). Water-soluble salts of the resulting dyestuff in aqueous solution dye wool and similar animal fibers in yellow shades, which can be improved by metallizing, for instance, by after-chroming treatment with aqueous solutions of sodium or potassium dichromate in the usual manner. The dyestuff, in the form of its free acid, has the following probable formula:

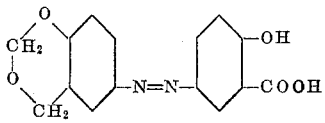

Variations and modifications can be made within the scope of the invention, and accordingly, the foregoing examples are to be interpreted in an illustrative rather than in a limiting sense.

For example, other insoluble monazo dyestuffs may be obtained by coupling diazotized 6-amino-1,3-benzodioxane with other coupling components of the classes of phenols, amines, and heterocyclic coupling components free from acid salt-forming groups. Examples of such other components are amino-benzodioxanes (such as, 6-amino-1,3-benzodioxane, 6-amino-1,4-benzodioxane), and arylides of 2,3-hydroxy-naphthoic acid (such as 2,3-hydroxy naphthoyl aniline, 2,3-hydroxy naphthoyl-3'-nitro aniline, 2,3-hydroxy naphthoyl-o-anisidin). The dyestuffs may be formed in substance or on the fiber.

Other azo dyestuffs may be obtained by coupling diazotized 6-amino-1,3-benzodioxane with coupling components containing acid salt-forming groups, such as a carboxyl group or a sulfonic acid group. Coupling components of this class comprise, for instance, cresotinic acids; 1-amino-8-naphthol-4-sulfonic acid (S-acid); 1-amino-8-naphthol-2,4- and 3,6-disulfonic acids (SS-acid and H-acid, respectively); 2-amino-8-naphthol-6-sulfonic acid (Gamma acid); 2-amino-5-naphthol-7-sulfonic acid (I-acid); 1-naphthol- and 1-naphthylamine-4-sulfonic acid (Neville-Winther acid and naphthionic acid, respectively); and 5,5'-dihydroxy-7,7'-disulfo dinaphthyl-2,2'-urea and -imide (I-acid-urea and -imide, respectively, which are suitable for the preparation of disazo dyestuffs). Dyestuffs thus prepared from N-phenol-2-amino-5-naphthol-7-sulfonic acid (Phenyl I-acid), 2-amino-5-naphthol-7-sulfonic acid, and 1-naphthol-4-sulfonic acid as coupling components have been found suitable for dyeing nylon.

Further, by substituting other diazotized amino-benzo-dioxanes (for example, diazotized 6-amino-1,4-benzodioxane) for the diazotized 6-amino-1,3-dioxane referred to above, azo dyestuffs having similar advantageous properties may be obtained.

I claim:
1. An azo dyestuff including in its structure a 6-azo-1,3-benzodioxane radical of which the dioxane nucleus is unsubstituted.

2. A water-insoluble monazo dyestuff having the general formula

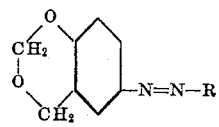

wherein R represents the radical of an azo coupling component which is free of acid salt-forming groups, said dyestuff dyeing cellulose acetate yellow to orange shades which are fast to washing and to sea water.

3. A water-insoluble monazo dyestuff having the formula

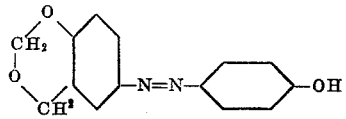

said dyestuff being insoluble in water, and dyeing cellulose acetate in yellow shades.

4. A water-insoluble monazo dyestuff having the formula

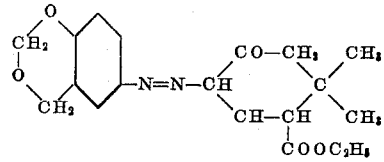

said dyestuff being insoluble in water, and dyeing cellulose acetate in yellow shades.

5. A water-insoluble monazo dyestuff having the formula

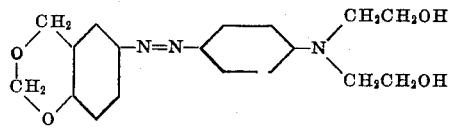

said dyestuff being insoluble in water, and dyeing cellulose acetate in yellow shades.

GEORGE CLIFFORD STROUSE.

REFERENCES CITED

The following references are of record in the file of this patent:

UNITED STATES PATENTS

| Number | Name | Date |
|---|---|---|
| 2,379,684 | Conn et al. | July 3, 1945 |
| 2,379,725 | Lecher et al. | July 3, 1945 |
| 2,391,137 | Danuser et al. | Dec. 18, 1945 |

OTHER REFERENCES

Chem. Abst., vol. 21, p. 233 (1927), citing F. D. Chattaway, J. Chem. Soc., pp. 2720–2727 (1926).

Chem. Abst., vol. 22, p. 1965 (1928), citing F. D. Chattaway, Anales Soc. espan. fis. quim., vol. 26, pp. 75–91 (1928).

F. D. Chattaway, J. Chem. Soc., 1928, pp. 3241–3246 (abstracted from Chem. Abst., vol. 23, 1929, p. 2975).

Certificate of Correction

Patent No. 2,468,277.  April 26, 1949.

GEORGE CLIFFORD STROUSE

It is hereby certified that error appears in the printed specification of the above numbered patent requiring correction as follows:

Column 5, line 53, for "phenol" read *phenyl*;

and that the said Letters Patent should be read with this correction therein that the same may conform to the record of the case in the Patent Office.

Signed and sealed this 4th day of October, A. D. 1949.

[SEAL]

THOMAS F. MURPHY,
*Assistant Commissioner of Patents.*